(12) United States Patent
Gierer et al.

(10) Patent No.: US 8,020,685 B2
(45) Date of Patent: *Sep. 20, 2011

(54) DEVICE FOR THE CONTROL AT LEAST OF A HYDRAULICALLY OPERABLE SWITCHING ELEMENT OF AN AUTOMATIC TRANSMISSION

(75) Inventors: Georg Gierer, Kressbronn (DE); Thilo Schmidt, Meckenbeuren (DE); Markus Herrmann, Scheidegg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/639,090

(22) Filed: Dec. 16, 2009

(65) Prior Publication Data

US 2010/0093490 A1    Apr. 15, 2010

Related U.S. Application Data

(62) Division of application No. 11/451,116, filed on Jun. 12, 2006, now Pat. No. 7,635,057.

(30) Foreign Application Priority Data

Jun. 25, 2005 (DE) .......................... 10 2005 029 589

(51) Int. Cl.
*F16D 48/06* (2006.01)
*F16D 25/12* (2006.01)
*F16H 61/18* (2006.01)

(52) U.S. Cl. ...................................... 192/85.63; 74/335

(58) Field of Classification Search .................... None
See application file for complete search history.

(56) References Cited

U.S. PATENT DOCUMENTS

| | | | |
|---|---|---|---|
| 4,494,423 A | 1/1985 | McCarthy et al. | |
| 4,896,568 A | 1/1990 | Gierer | |
| 4,981,052 A | 1/1991 | Gierer | |
| 5,337,625 A | 8/1994 | Jang | |
| 6,055,879 A | 5/2000 | Abe et al. | |
| 6,997,300 B2 | 2/2006 | Schmidt et al. | |
| 7,635,057 B2 * | 12/2009 | Gierer et al. | 192/85.63 |

FOREIGN PATENT DOCUMENTS

| | | |
|---|---|---|
| DE | 37 13 585 | 11/1987 |
| DE | 197 25 833 | 1/1998 |
| DE | 198 58 540 | 6/2000 |
| DE | 103 03 639 | 8/2004 |

* cited by examiner

*Primary Examiner* — Richard M. Lorence
(74) *Attorney, Agent, or Firm* — Davis & Bujold, P.L.L.C.

(57) ABSTRACT

A device for controlling a hydraulically operable switching element (2) of an automatic transmission of a vehicle with a position valve mechanism (3) having a main switch piston (6) which is spring biased into a first switch position and a second switch position with a pilot pressure (P_MV) which is adjustable through an electrically operated actuator (5). An additional switch piston (7) and the main switch piston (6) are axially actuated in a valve housing (8). Depending on the position of the pistons (6, 7), faces (6A, 7A) of the respective pistons are either spaced apart or adjacent. The additional switch piston (7) is adjustable depending on a pilot pressure (p_K) of a switching element which engages a gear for forward drive.

7 Claims, 3 Drawing Sheets

DEVICE FOR THE CONTROL AT LEAST OF A HYDRAULICALLY OPERABLE SWITCHING ELEMENT OF AN AUTOMATIC TRANSMISSION

This is a divisional application of U.S. application. Ser. No. 11/451,116 now U.S. Pat. No. 7,635,057 filed Jun. 12, 2006 which claims priority from German Application Serial No. 10 2005 029 589.4 filed Jun. 25, 2005.

FIELD OF THE INVENTION

The invention concerns a device for the control at least of a hydraulically operable switching element of an automatic transmission of a vehicle with a position valve mechanism.

BACKGROUND OF THE INVENTION

In the operation of automatic transmissions known from the operation of automobiles, switching elements implemented as clutches or brakes are operated depending on a driver-sided, currently selected operating gear, as for example "forward-drive,' "reverse-drive," neutral," or "park" and a current working condition of the vehicle via an hydraulic control. In order to reduce the required design envelope, such automatic transmissions are activated by a so-called electrified hydraulic switching device, by way of which a driver-desired input requirement is transferred via an electrically active connection between an operator control provided for a driver in the interior of the automobile to an electronic-hydraulic controller in the area of the transmission of the automobile.

An electronic-hydraulic controller of an automatic switching automobile transmission is known from DE 198 58 540 A1, with which the active connection between operator controls on the part of the driver for the switching and/or drive program override and the gearbox designed, as an electronic-hydraulic controller, is implemented electrically and with which an electronic control unit of the electronic-hydraulic controller is activated directly via the electrically active connection. The electrically activatable solenoid valves and electrically activatable pressure control valves are directly activated by the electronic control unit.

With an eventual failure of the electronic control unit, the solenoid valves, provided as actuators, and the electrical pressure control valves are automatically switched off. Thus, by way of pressurization by certain switching elements, assigned control valves are acted upon with hydraulic pressure so that the vehicle can be driven independently to a nearby workshop, albeit with restrictions on the operation of the automatic transmission.

For this purpose a multi-stage, dry-running operation is started, if an error is identified in an electrical gearbox, and the controller, active in the operation, is deactivated with the effect that the pressure control valves electrically activatable by the electrical gearbox mechanism are no longer activatable by the inactive (and thus switched off) gearbox mechanism. The multi-stage, dry-running operation of the electrically operated gearbox is provided, in order with high vehicle velocities, to put in the automatic transmissions a highest possible emergency or an emergency gear adjusted to the current vehicle velocity, which exerts only minor effects on a drive train of a vehicle.

Since with a high gear in the output of a vehicle only minor tractive forces are present, a start of a vehicle from standstill with high gear put in the automatic transmission is difficult or not at all feasible. For this reason, it is provided with an activated emergency operation, to put an emergency gear in the automatic transmission, which corresponds to a low gear of the automatic transmission in which, in the change from a high emergency gear to the low emergency gear, a restart of the vehicle is basically to be accomplished.

In order basically to prevent a false activation of such an automatic transmission, the pressure supply of the switching element first results after securing a trouble-free operation of the electronic gearbox, which causes a shift of a valve gate generally designated as a position valve mechanism via an electrical actuator.

In order to continue maintaining the pressure supply of certain switching elements during emergency operation in which the electrical supply of the gearbox is dispensed with and all electrical actuators are in their initial position, the electrical signal of an electrical actuator must be replaced by another signal available in the emergency program, since otherwise at least the last operating condition inserted or the gear range of the automatic transmission cannot be maintained.

Especially with controllers with short hydraulic circuits which, due to small volume, can offer no hydraulic elasticity, spring-operated accumulators are inserted by which, at least for a period of time, as long as the spring-operated accumulator is relaxed, the pressure in this circuit can be sustained with the failure of the electronics. As soon as such a spring-operated accumulator is emptied or the spring stops, the pressure supply to the clutch also collapses here. Such spring-operated accumulators are, therefore, only suitable to bridge short-term electronic failures, for example, for a time span of 20 milliseconds, during which a changeover of the valve would otherwise already occur.

The pressure of a clutch can be used as a hydraulic, spring-operated accumulator, whose pressure is also sustained with short-term under-supplies of the system pressure. For example, if a pressure accumulator function of 1 bar is selected with the construction of the position valve, the retaining function may not be above a clutch pressure of 1 bar.

This small retaining pressure results in the fact that in the operating gears "neutral" and "reverse drive", the lock of the position valve mechanism is already activated with a very small, erroneously activated clutch-pressure and a pressure signal rests against the gearbox, which selects the operating gear "forward drive" in the automatic transmission, even though this does not correspond to the demand of the driver. That means that in the operating gears "reverse drive", "neutral", or "park", locking the position valve mechanism is not desired and should be avoided as much as possible.

A device for the control of a hydraulically operable clutch of an automatic transmission by way of which the lock of the position valve mechanism selecting the operating gear "forward drive" in the automatic transmission is avoided with an inappropriate demand on the part of the driver, is known from DE 103 03 639 A1. For this reason, an electrically activatable actuator with a disturbance-related, cut-off is provided, so that the pressure in a first working chamber of the position valve mechanism is assigned to the transition into an emergency operation gear assigned to the current operation gear of the automatic transmission by way of a second piston. The second piston is connected via a second working chamber and a clutch area of a switching element or a switching element inserted in parallel to it and with a cut-off of the actuator forms a kind of damper. This damper holds the filling or the emptying of the switching element in the adjusting valve piston in a position assigned to the current operation gear for a given duration of time, within which a safe malfunction detection is executable via the electronic gearbox.

However, it is disadvantageous that the duration of time available for the suggested device is possibly inadequate for safe malfunction detection on the transmission side and switching elements are activated in the transmission, which do not correspond with an operating condition needing adjustment of the automatic transmission.

Therefore, the task which underlies the invention at hand is to make a device available for the control of a hydraulically operable switching element of an automatic transmission of a vehicle by way of which erroneous activations of an automatic transmission are safely avoided.

SUMMARY OF THE INVENTION

The device, according to the invention, for the control at least of a hydraulically operable switching element of an automatic transmission of a vehicle is implemented with a position valve mechanism, which shows an admittable main switch piston sprung in the direction of a first switch position as well as via a control line in the direction of a second switch position with a pilot pressure adjustable through an electrically operated actuator and an additional switch piston cooperating with it. The main switch piston and the additional switch piston are arranged moveably lengthwise in a valve housing and are in first switch positions and in second switch positions in the area overlooking each other's face surfaces in the installation. Moreover, the main switch piston and the additional switch piston are in the second switch position of the main switch piston and, at the same time, the first switch position of the additional switch piston in the area of its overlooking face surfaces is distant from the other, whereby the additional switch piston is admittable via a working chamber in the direction of its second switch position with the pressure of a clutch area of a control element switched on for the execution of a gear in the force flow.

Thus, that the additional switch piston shows a control area of reduced diameter arranged between two ranges of command with reduced diameter compared with the ranges of command lands, over which at least two control ports of the position valve mechanism are in active connection with one another, depending on an axial position of the additional switch piston, a control signal provided for the activation of the hydraulically operable switching element is applied or not, especially to the switching element, depending on the switch position of the additional switch piston.

That means that a control signal required for the activation of the switching element, which is available in normal operation, i.e., in the closed condition of the transmission mechanism or in an emergency operation, i.e., in an open condition of the transmission mechanism, is transmitted simply in a certain switch position of the additional switch piston and the switching element is only activated if the operating condition of the automatic transmission corresponding to it is actually demanded.

For this reason, erroneous activations in the transmission are avoided through a constructively simple design of the additional switch piston and of the valve housing of the position valve mechanism corresponding to it in a cost-efficient manner which, for example, with automatic transmissions known from experience, is prevented through cost-intensive pressure sensors and valve-way sensors, by way of which a false activation on the part of the transmission device is ascertainable before a gear change and consequential laborious error logging.

BRIEF DESCRIPTION OF THE DRAWINGS

The invention will now be described, by way of example, with reference to the accompanying drawings which are applied for clarity's sake in the description of the different implementation examples for constructive and functional components of the same reference Figures, in which.

DETAILED DESCRIPTION OF THE INVENTION

Figure 1:
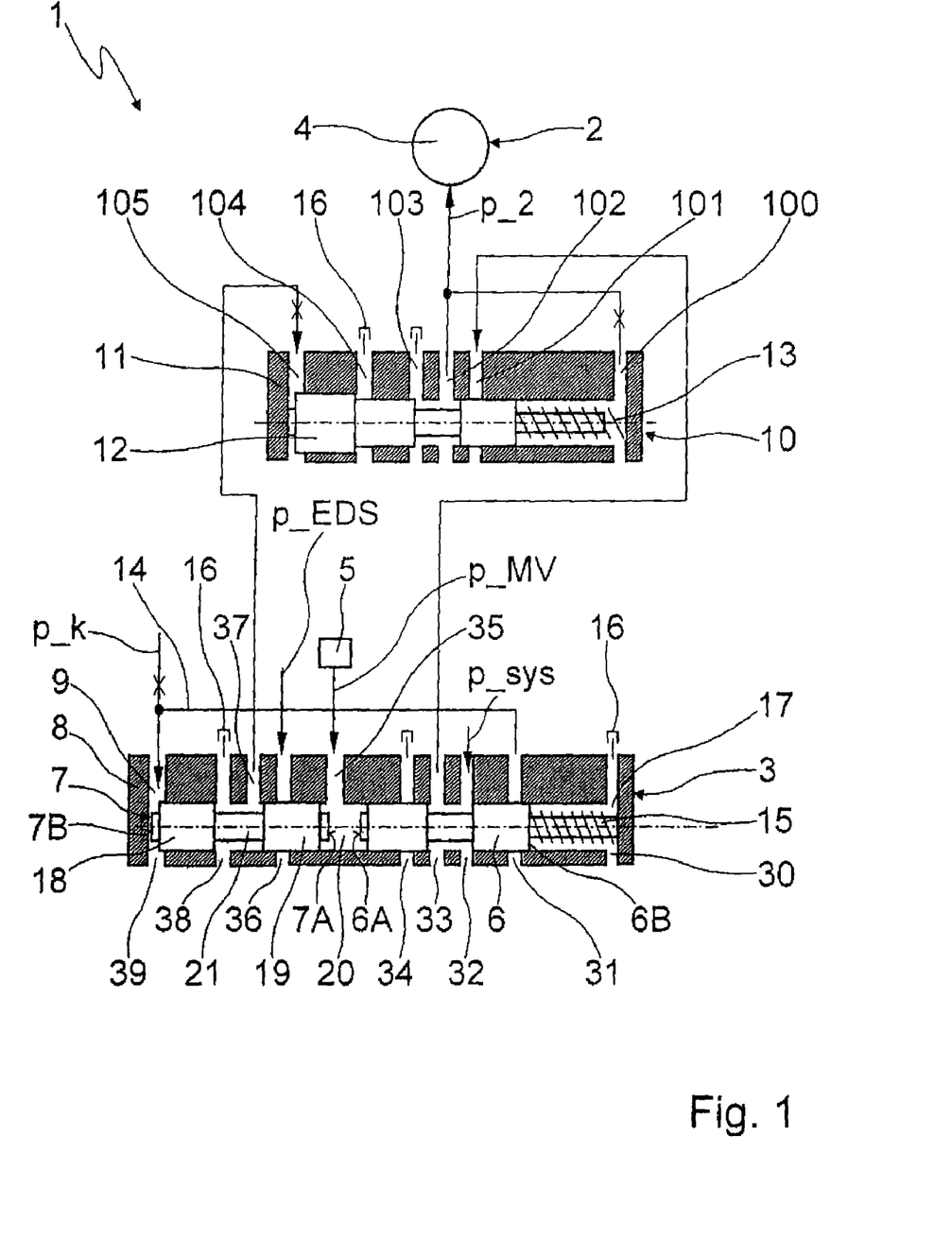
FIG. 1 is a principle layout of a first implementation example of a device, according to the invention, for the control of a hydraulically operable switching element with a position valve mechanism shown in a longitudinal section and a valve mechanism actively connected with it.

FIG. 1 shows a device 1 for controlling at least a hydraulically operable switching element 2 of an automatic transmission of a vehicle (not shown), which is activated by a known electrified hydraulic switching device or a gearbox with a position valve mechanism 3 designed as a pressure control valve and a valve mechanism 10 actively connecting with it and implemented as a pressure regulation valve.

The switching element 2 is a frictional disk clutch, whose frictional disks can be brought more or less strongly into frictional contact with one another via a hydraulic piston mechanism in an known manner to adjust transmission capacity. For simplicity only, a clutch area 4 of the piston mechanism, shown in the diagram, is acted upon via the position valve mechanism 3 and the valve mechanism or the pressure regulation mechanism 10 with a pilot pressure $p\_2$ required for the adjustment of transmission capacity.

The position valve mechanism 3 contains an admittable main switch piston 6 biased in the direction of a first switch position, as well as via a control line in the direction of a second switch position, represented in FIG. 1, with a pilot pressure $p\_MV$ adjustable through an electrically operated actuator 5 and an additional switch piston 7 cooperating with it.

The actuator 5 is designed as a solenoid valve or as a pressure proportional valve and notwithstanding can also be a piezoelectric actuator or be implemented as any other appropriate and electrically operable actuator.

The main switch piston 6 and the additional switch piston 7 are implemented moveably lengthwise in a valve housing 8 of the position valve mechanism 3 and are located in the first switch positions and in the second switch positions in the area overlooking each other's face surfaces 6A, 7A in the installation. In the second switch position of the main switch piston 6 and, at the same time, with the existence of the additional switch piston 7 in its first switch position represented in FIG. 1, both valve gates 6 and 7 are distanced from each other in the area of their overlooking face surfaces 6A and 7A, in the manner represented in FIG. 1, and define a working chamber 20 inside the valve housing 8 of the position valve mechanism 3.

Furthermore, the additional switch piston 7 is acted upon in the area of its face surface 7B turned away from the main switch piston 6, via a working chamber 9 in each case with selected operating gear "forward drive" of the automatic transmission with a pilot pressure $p\_K$ of a switch element, which is connected to the force flow for the execution of a forward drive gear of the automatic transmission. In the process, it is provided that the working chamber 9 of the position valve mechanism 3 is acted upon, via an unprecisely depicted switchover element always with the pilot pressure $p\_K$ supplied with a switched on switching element in the automatic transmission adjusted operating gear "forward drive".

A pressure admission or pressure release of the switching element 2 is set corresponding to an operating gear "forward drive," "reverse drive," "neutral," or "park via the position valve mechanism 3. The position valve mechanism 3 thereby represents a valve mechanism with the functionality of a mechanical selection gate by way of which the electrically requested operating position or the operating gear of the automatic transmission is mapped and with which the equivalent pressure supply of the switching element 2 is transferred with the respectively requested operating gear.

The valve housing 8 of the position valve mechanism may, in addition, be implemented with several control ports 30 to 39 by which both the main switch piston 6 and the additional switch piston 7 are adjusted at their face surfaces 6A, 6B, and 7A, 7B with different pressure signals and by which pressure signals adjacent to the position valve mechanism 3 are conductible, depending on the switch positions of the main switch piston 6 as well as of the additional switch piston 7 to the valve mechanism 10 actively connecting with the position valve mechanism 3.

The valve mechanism 10 has a valve gate 12 arranged between two final positions moveable lengthwise in a valve housing 11, which is sprung via a spring-operated mechanism 13 into the first final position, shown in FIG. 1. In addition, the valve mechanism 10, likewise, has several control ports 100 to 105, whereby the valve gate 12 is adjusted at its ends with hydraulic control signals via the control ports 100 and 105, in such a way that the switching element 2 is activatable with the pilot pressure p_2 required for the respective transmission capacity asked for.

In normal operation of the automatic transmission, the operating gears "neutral," "reverse drive," "forward drive," and "park" are set depending on the switch position of the main switch piston 6, as well as of the additional switch piston 7, which vary in each case depending on the hydraulic pilot signal p_MV of the actuator 5 and the hydraulic pilot signal p_K of a switch element switched on to the operating gear "forward drive." The pilot signals p_MV and p_K are, in turn, dependent upon the requirement desired by the driver, which is electronically transmitted to the gearbox from the operating controls provided in the passenger compartment of the vehicle.

With a disruption of the gearbox, which causes the power to the gearbox to switch off, the automatic transmission is activated in a so-called emergency operation in which the hydraulic pilot signal p_MV of the actuator in essence drops to zero, since the actuator 5 is locked in disconnected condition and the hydraulic pressure adjacent to the actuator 5 is not transferred to the position valve mechanism 3.

Depending on the operating gears set for the detection of failure of the gearbox in the automatic transmission, the emergency operation of the automatic transmission is switched over either into the emergency operating gear "forward drive" or "park," whereby, with a transition of the activation of the automatic transmission from normal operation into the emergency operation, the operating gear is always changed starting from the operating gears "neutral," "reverse drive," or "park" into the emergency operation gear "park".

This results from the fact that the additional switch piston 7 is acted upon neither in the operating gear "neutral" and "reverse drive" nor in the operating gear "park" via the working chamber 9 of the position valve mechanism 3 with the pilot pressure p_K of a switching element, which is only switched on for the execution of a forward drive gear in the flow force, since this pilot pressure p_K is then essentially zero. In addition, since the pilot signal p_MV of the actuator 5 is also zero in the emergency operation, both the main switch piston 6, as well as the additional switch piston 7, are pushed by a spring operated mechanism 15 of the position valve mechanism 3 into their respective first switch position, whereby the operating gear "park" is set.

On the contrary, if during normal operation of the automatic transmission in the selected operating gear "forward drive" an operating disruption occurs in the area of the gearbox, during which both the main switch piston 6 and the additional switch piston 7 are located in their second switch position due to the adjacent pilot signals p_MV and p_K, which causes a transition from the normal operation into the emergency operation of the automatic transmission, the system switches over to the emergency operating gear "forward drive".

Then the main switch piston 6 is kept by the additional switch piston 7 for a limited time in its second switch position, which is preferably longer than a diagnostic time of the gearbox, since the pilot pressure p_K of the switching element currently switched on for the execution of the forward drive gear also abuts the additional switch piston 7 in the area of the working chamber 9 of the position valve mechanism 3 in the emergency operation of the automatic transmission for a defined time period. While the diagnosis is verified, via an actually well known two-stage, dry-running concept described in application DE 103 03 639 A1, in which a forward drive gear was inserted at the time of the operating disturbance of the gearbox. Subsequently, an emergency gear assigned to this gear for the forward drive in the automatic transmission is inserted through a simultaneous switching on of two switching elements in the force flow of the automatic transmission.

So that the additional switch piston 7 is located in its first switch position, the pilot pressure p_MV set, via the actuator 5, and the surface ratio between the two face surfaces of the additional switch piston 7 are inserted in such a manner that a total force component operating in the direction of its first switch position engages the additional switch piston 7. This assumes that the adjacent pilot pressure p_K in the working chamber 9 abuts the additional switch piston 7 with a height corresponding to this premise. Since the face surfaces 7A and 7B of the additional switch piston 7 in the implementation example, represented in FIG. 1, are equally large, in the normal operation of the automatic transmission, the pilot pressure p_MV controllable via the actuator 5 is to be set higher than the pressure prevalent in the working chamber 9 when the operating gears "neutral" and "reverse drive" are selected.

In the second switch position of the main switch piston 6, a system pressure p_sys adjacent to the third control port 32 of the position valve mechanism 3 is led via a reduced diameter control area of the main switch piston 6 and the fourth control port 33 connected with the third control port 32 to the second control port 101 of the valve mechanism.

The pilot pressure p_K, led via an energizing lead 14 to the second control port 31 of the position valve mechanism 3, is separated in the second switch position of the main switch piston 6 from a spring-operated space 17 of the position valve mechanism 3 and, consequently, not connected with a release space 16. That means that the working chamber 9 of the position valve mechanism 3 is, in essence, pressurized and the pilot pressure p_K affects the face of the additional switch piston 7 turned away from the main switch piston 6.

The system pressure p_sys, adjacent to the second control port 101 of the valve mechanism 10, which represents the supply pressure of the switching element 2, is not interconnected to the switching element 2 in the first switch position of the valve gate 12 of the valve mechanism 10, represented in FIG. 1. This results from the fact that a pilot pressure p_EDS provided for the switching over of the valve gate 12, which abuts the seventh control port 36 of the position valve mechanism 3, which is set by a pressure control valve of the gearbox and which counteracts the valve gate 12 of the spring force of the spring-operated mechanism 13, in the first switch position of the additional switch piston 7, is not connected to the valve mechanism 10 and the valve gate 12 of the valve mechanism 10 is located in its first switch position blocking the pressure delivery to the switching element 2.

That means that the switching element 2 in the first switch position of the additional switch piston 7, which receives the additional switch piston in the operating gears "neutral", "reverse drive" or "park", is not activatable in the corresponding manner for a connection and thus a false activation of the switching element 2, which is not to be switched on for the execution of these operating gears, is prevented in a simple manner depending on the switch position of the additional switch piston 7. An activation of the switching element 2 occurs only when the additional switch piston 7 is located in its second switch position, which it receives in the requested operating gear "forward drive" of the automatic transmission both in the normal operation and in the emergency operation.

So that the map-based, pilot control of the switching element 2 is led, via the position valve mechanism 3, the switching element 2 itself is acted upon with its supply pressure first with the pilot pressure p_EDS adjacent to the seventh control port 36 of the position valve mechanism 3 and with the system pressure p_sys adjacent to the second control port 101 of the valve mechanism 10, when the pilot pressure p_EDS of the valve mechanism 10 in the area of the position valve mechanism 3 is interconnected in the direction of the pressure regulation valve 10.

Figure 2:
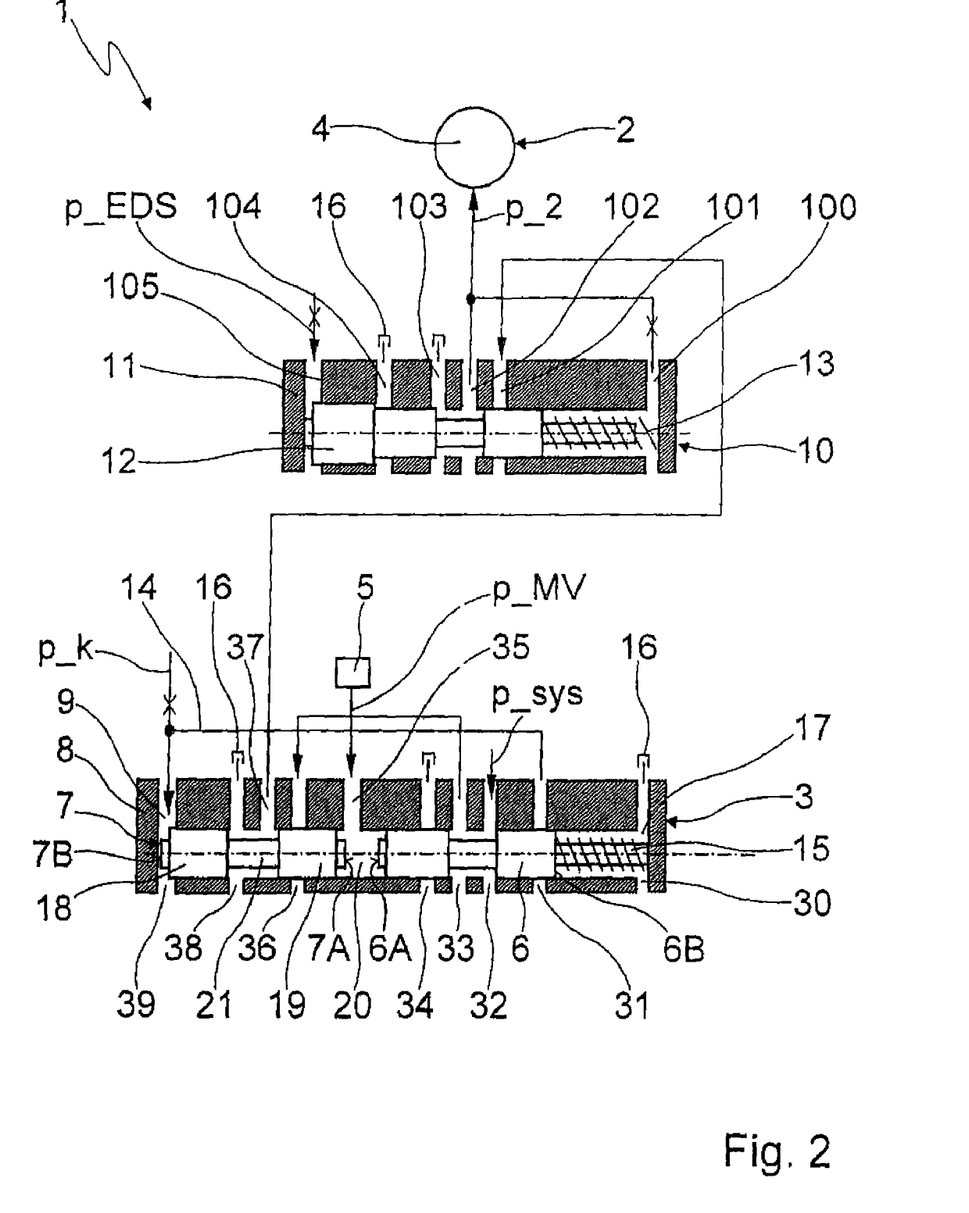
FIG. 2 is a second implementation example of the device, according to the invention, in a representation corresponding to FIG. 1.

In FIG. 2, a second implementation example of the device 1, according to the invention, for the control of a hydraulically operable switching element of an automatic transmission, is shown in a representation corresponding to FIG. 1, in which the position valve mechanism 3 and the valve mechanism 10 correspond in essence with the valve mechanisms shown in FIG. 1.

The device 1, represented in FIG. 2, differs from the device 1 represented in FIG. 1 in that the valve mechanism 10 is acted upon directly with the pilot pressure p_EDS and the system pressure p_sys to be fed to the switching element 2 as supply pressure via the sixth control port 35 and the seventh control port 36 of the position valve mechanism 3 is led to the second control port 101 of the pressure regulation valve 10 at the corresponding switch position of the additional switch piston 7. That means that the switching element 2, as in the implementation example of device 1, in accordance with FIG. 1, is first connected with the corresponding switching over of the additional switch piston 7 from its first switch position to its second switch position.

Thus, with the second implementation example of device 1, a false activation of the switching element 2 is avoided by the fact that the switching element 2, despite corresponding to pilot pressure p_EDS adjacent to the valve gate 12, which switches over the valve gate 12 of the valve device 10 into its second switch position and the connection between the second control port 101 and the third control port 102 of the valve device 10 is disconnected, when the supply line conducting the system pressure p_sys between the position valve mechanism 3 and the valve mechanism 10 through the additional switch piston 7 has been disconnected.

The two previously described implementation examples of a device 1 are especially suited for use with gearboxes, with which two switching elements are alternately activated by the same electrically activatable actuator in order to avoid false activations in the area of this switching element.

Figure 3:
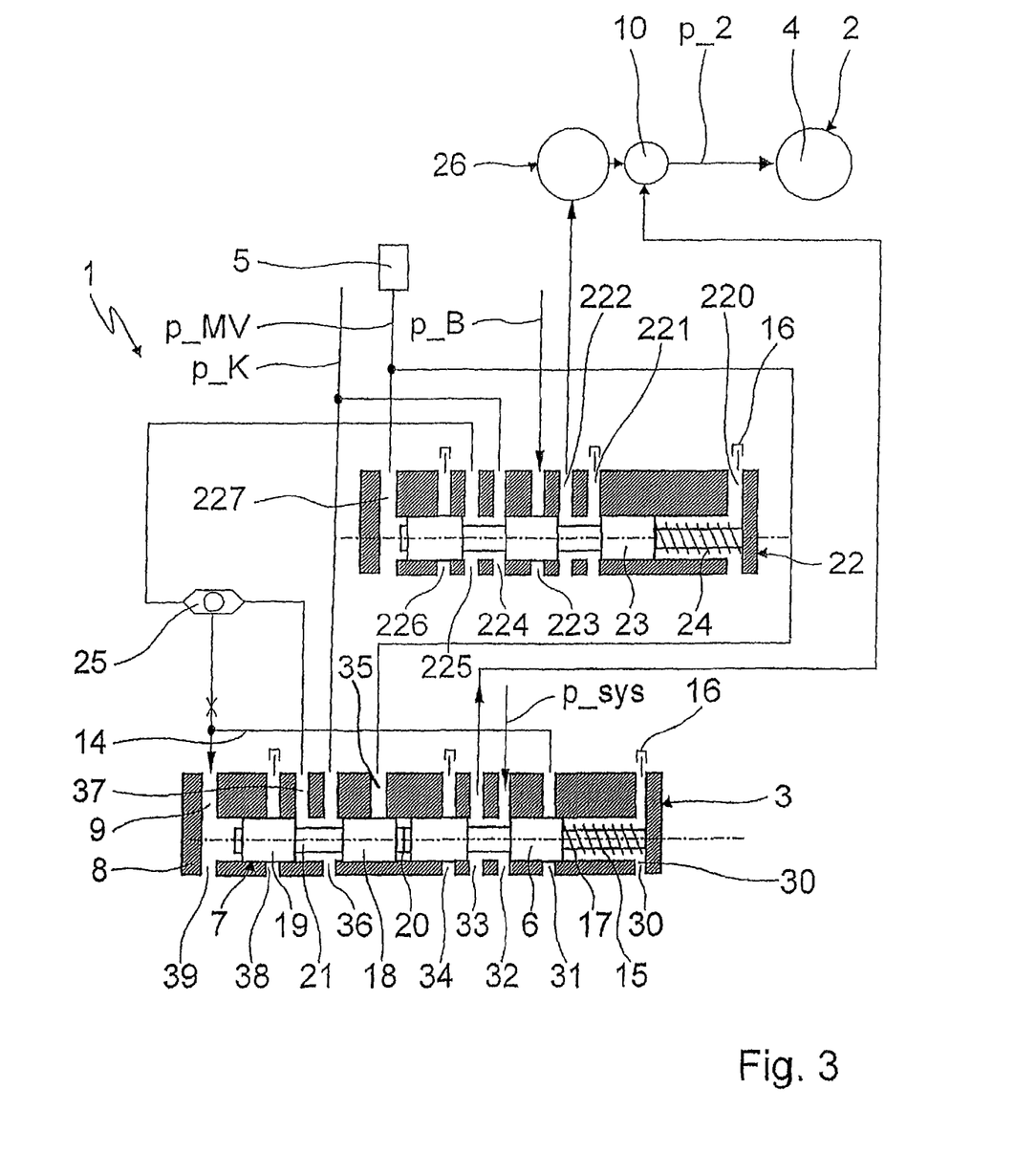
FIG. 3 is a third implementation form of the device, according to the invention, in a representation corresponding to FIG. 1 and FIG. 2.

FIG. 3 shows a third implementation example of device 1 designed, according to the invention, which is used with a hydraulic control system of an automatic transmission with which an electrically operable actuator designed as a pressure control valve is precisely assigned to each switching element. At the same time, for the avoidance of false activations as well as for the execution of the so-called and well-known two-stage emergency concept with selected operating gear "forward drive" in the automatic transmission, a valve mechanism 22, represented in FIG. 3 and subsequently further denoted as an emergency switch valve, is provided with eight control ports 220 to 227 in combination with the position valve mechanism 3 according to FIG. 1 and FIG. 2.

The additional switch piston 7 of the position valve mechanism 3 is designed, as with the implementation example of device 1 in accordance with FIG. 1 and FIG. 2, with a switch function, i.e., with a control area 21 arranged between two lands 18 and 19, which is designed with a reduced diameter in comparison to lands 18 and 19, and can be brought into active connection with one another via two of the respective control ports 36, 37 and 38, depending on an axial position of the additional switch piston 7.

In the normal operating condition of the electrical gearbox mechanism, in which the pressure control valve of a control system of the automatic transmission as well as the actuator 5 are electrically activatable, the actuator 5 is charged during all operating conditions of the automatic transmission except for the operating condition of the automatic transmission, in which the electrical selector lever position "park" is set. Therefore, at least the main switch piston 6 of the position valve mechanism 3, which is sprung by the spring-operated mechanism 15 in the direction of the additional switch piston 7 of the position valve mechanism 3, is kept through the pilot pressure p_MV of the solenoid valve 5 in its second and shifted over, switch position, represented in FIG. 3, and the system pressure p_sys, adjacent to the position valve mechanism 3, is transferred in the direction of the switching element.

At the same time, a valve gate 23 of the emergency switch valve 22 is kept in its second switch position with the active gearbox mechanism through the pilot pressure p_MV of the charged actuator 5 in opposition to a spring-operated mechanism 24, whereby the third control port 222 of the fourth control port 223 is blocked, on which a pilot pressure p_B of a switching element abuts depending on the selected operating gear of the automatic transmission, which is connected at least for the execution of the forward drive gears of the automatic transmission, which are used alternately in the emergency operation of the automatic transmission as emergency gears.

In addition, the additional switch piston 7 is acted upon with the pilot pressure p_MV in the charged actuator 5 in the area of its face surface 7A overlooking the main switch piston 6. The pilot pressure p_K of the switching element with the selected operating gear "forward drive" abuts its face surface 7B turning away from the main switch piston 6, which is connected for the execution of a forward drive gear currently inserted in the automatic transmission, whereby the pilot pressure p_K with the switched over emergency switch valve 22 is admittable via the sixth control port 225 connected with the fifth control port 224 and an or-valve 25 designed as a spherical valve.

If the additional switch piston 7 is admitted with the pilot pressure p_K via the working chamber 9, which is greater than the pilot pressure p_MV of the actuator 5 then the additional switch piston 7 is switched over in its second shifted over switch position equivalent to the operating gear "forward drive" of the automatic transmission, so that the seventh control port 36 is connected with the eighth control port 37 of the position valve mechanism 3 and the pilot pressure p_K next to the feed line abuts the or-valve 25 via the sixth control port 225 of the emergency switch valve 22 as well as via the eighth control port 37 of the position valve mechanism 3.

With a failure of the gearbox mechanism of the automatic transmission, the actuator 5, as well as all other electrically activatable pressure control valves, are turned off, which then switch over to their initial state. Thus, the pilot pressure p_MV of the actuator 5 falls in essence to zero and the required pressure signal for the locking of the connection between the third control port 222 and the fourth control port 223 of the emergency switch valve is canceled. This leads to the fact that the emergency switch valve 22 is switched over into its first switch position through the spring-operated mechanism 24, whereby the fifth control port 224 is locked with respect to the sixth control port 225 and the connection between the pilot pressure p_K and the or-valve 25 is separated in this area That means that the pilot pressure p_K still abuts the additional switch piston 7, but only in the case when the latter was switched over to its second switch position for the period of time of the operating disruption of the gearbox.

The system pressure p_sys adjacent to the third control port 32 of the position valve mechanism 3 is also led with the dead actuator 5 via the position valve mechanism 3 in the direction of different switching elements of the automatic transmission, when the main switch piston 6 is kept by the additional switch piston 7 of the position valve mechanism 3 in its shifted over position or its second switch position. This condition of the position valve mechanism 3 exists when the additional switch piston 7, depending on the operating condition of the automatic transmission existing at the time of the failure of the gearbox mechanism, impinges on the side of its face 7B turned away from the main switch piston 6 with a corresponding pilot pressure p_K of a switching element for the execution of a forward drive gear via the or-valve 25.

In addition, the clutch pilot pressure p_B adjacent to the fourth control port 223 of the emergency switch valve 22 interconnects in the direction of a selection switch valve 26 and leads as a pilot pressure signal to the clutch valve ordered to the switching element 2 to be activated, i.e., for example to a clutch valve corresponding to the valve mechanism 10 shown in FIG. 2, which corresponds to the switching element of the automatic transmission, which is selected via the selection switch valve 26 for the execution of the emergency gear currently to be inserted and for this reason is the switching element to be connected.

With the implementation form of the device 1, according to the invention represented in FIG. 3, it is guaranteed that the position valve mechanism 3 cannot be connected to its lock with an emergency switch valve 22 jamming in its first switch position and with a transition into the emergency operation of the automatic transmission the operating gear "neutral" of the automatic transmission is always set.

Furthermore, with a switching device of an automatic transmission with electrified selection lever with the device 1, according to FIG. 3, it is guaranteed that, with the transition from the operating gear "reverse course" in the emergency operation of the automatic transmission and a simultaneous mechanically jamming emergency switch valve for unplugging the gearbox, the automatic transmission is activated by the hydraulic switching device not in the form that a speed transmission gear for forward drive is set in the automatic transmission as emergency course speed transmission gear.

REFERENCE NUMERALS

1 device
2 switching element
3 position valve mechanism
4 clutch area
5 actuator
6 main switch piston
6A, 6B face surface of the main switch piston
7 additional switch piston
7A, 7B face surface of the additional switch piston
8 valve housing of the position valve mechanism
9 working chamber of the position valve mechanism
10 valve mechanism
11 valve housing of valve mechanism
12 valve gate of valve mechanism
13 spring-operated mechanism of the valve mechanism
14 energizing lead
15 spring-operated mechanism
16 release space
17 spring-operated space of the position valve mechanism
18, 19 land of command of the additional switch piston
20 working chamber
21 control section
22 emergency switch valve
23 valve gate of the emergency switch valve
24 spring-operated mechanism of the emergency switch valves
25 or-valve
26 selection switch valve
30-39 control ports of the position valve mechanism
100-105 control ports of the valve mechanism
220-227 control tongues of the emergency switch valves
p_pilot pressure
p_EDS pilot pressure of the valve mechanism
p_K pilot pressure of a switching element
p_MV pilot pressure of the actuator
p_sys system pressure, supply unit pressure
p_2 pilot pressure of the energizing switching element

The invention claimed is:

1. A device (1) for controlling a single hydraulic switching element (2) of an automatic transmission of a vehicle, the device (1) comprising:

a position valve mechanism (3), including a system pressure input port (32), a system pressure output port (33), at least two control ports (36, 37, 38), a main switch piston (6) and an additional switch piston (7);

the additional switch piston (7) and the main switch piston (6) each being coaxially slidable within a valve housing (8) between respective first and second switch positions;

the main switch piston (6) is hydraulically biased into the second switch position by an adjustable actuator pilot pressure (P_MV) and resiliently biased into the first switch position;

the additional switch piston (7) is hydraulically biased, via a working chamber (9), to the second switch position with a switching element pilot pressure (p_K); and the main switch piston (6) has a control area located between two lands of the main switch piston (6), the control area of the main switch piston (6) having a reduced diameter compared to diameters of the two lands of the main switch piston (6), the system pressure input port (32) is connected to a system pressure (p_sys), and the system pressure output port (33) is connectable with the system pressure input port (32), depending on an axial position of the main switch piston (6), for controllably providing the system pressure (p_sys) at the system pressure output port (33); and the additional switch piston (7) has a control area located between two lands (18, 19) of the additional switch piston (7), the control area of the additional switch piston (7) having a reduced diameter compared to diameters of the two lands (18, 19) of the additional switch piston (7), a first control port (36) of the at least two control ports is connected to one of a valve mechanism pilot pressure (p_EDS) and the system pressure (p_sys) and is connectable with a second control port of the at least two control ports (37, 38), depending on an axial position of the additional switch piston (7), for controllably providing the one of the valve mechanism pilot pressure (p_EDS) and the system pressure (p_sys) at the second control port of the at least two control ports (37, 38); and a pressure regulation valve (10), comprising a first input port (101), an output port (102), a second control input port (105) and a valve gate piston (12) which is axially slidable in a valve housing (11) between first and second positions;

the valve gate piston (12) being resiliently biased toward the first position and hydraulically biased toward the second position by the valve mechanism pilot pressure (p_EDS) which is provided to the second control input port (105) of the pressure regulation valve (10);

the valve gate piston (12) having a regulation control area located between two lands of the valve gate piston (12), the regulation control area of the valve gate piston (12) having a reduced diameter compared to diameters of the two lands of the valve gate piston (12); and the first input port (101) of the pressure regulation valve (10) is connectable with the system pressure (p_sys) via the position valve mechanism (3);

the output port (102) of the pressure regulation valve (10) controllably providing a switching element control pressure (p_2) to the switching element (2) depending on an axial position of the valve gate piston (12); and the switching element control pressure (p_2) is controlled by the adjustable actuator pilot pressure (P_MV), the valve pilot pressure (p_EDS) and the switching element pilot pressure (p_K).

2. The device according to claim 1, wherein the first control port (36) of the at least two control ports is open to the second control port (37) of the at least two control ports, in the second switch position of the additional switch piston (7), and is supplied with the valve mechanism pilot pressure (p_EDS) for adjusting the switching element control pressure (p_2) of the switching element (2), and the second control port (37) of the at least two control ports is open to a third control port (38) of the at least two control ports, in the first position of the additional switch piston (7), and the second control port (37) of the at least two control ports is connected to the second control input port (105) of the pressure regulation valve (10).

3. The device according to claim 1, wherein the first control port (36) of the at least two control ports is combinable with the second control port (37) of the at least two control ports, via the additional switch piston (7), and is supplied with the supply pressure (p_sys) and a third control port (38) of the at least two control ports is combinable with the second control port (37) of the at least two control ports, via the additional switch piston (7), the second control port (37) of the at least two control ports directly connects with the first input port (101) of the pressure regulation valve (10), which is combinable, via the valve gate piston (12) of the pressure regulation valve (10), with a clutch (4) of the hydraulic switching element (2).

4. The device according to claim 1, wherein the working chamber (9) of the valve mechanism (3) communicates with a release space (16) when the main switch piston (6) is in the first switch position.

5. The device according to claim 1, wherein the second control port (37) of the at least two control ports (36, 37, 38) of the valve mechanism (3) is combinable with a third control port (38) of the at least two control ports (36, 37, 38) of the valve mechanism (3), via the additional switch piston (7), and the third control port (38) is connected with a release space (16).

6. A device (1) for controlling a single hydraulic switching element (2) of an automatic transmission of a vehicle, the device (1) comprising:

a position valve mechanism (3), including a system pressure input port (32), a system pressure output port (33), at least two control ports (36, 37, 38), a main switch piston (6) and an additional switch piston (7);

the additional switch piston (7) and the main switch piston (6) each being coaxially slidable within a valve housing (8) between respective first and second switch positions;

the main switch piston (6) is hydraulically biased into the second switch position by an adjustable actuator pilot pressure (P_MV) and resiliently biased into the first switch position;

the additional switch piston (7) is hydraulically biased, via a working chamber (9), to the second switch position with a pilot pressure (p_K); and the main switch piston (6) has a control area located between two lands of the main switch piston (6), the control area of the main switch piston (6) having a reduced diameter compared to diameters of the two lands of the main switch piston (6), the system pressure input port (32) is connected to a system pressure (p_sys), and the system pressure output port (33) is connectable with the system pressure input port (32), depending on an axial position of the main switch piston (6), for controllably providing the system pressure (p_sys) at the system pressure output port (33); and the additional switch piston (7) has a control area located between two lands (18, 19) of the additional switch piston (7), the control area of the additional switch piston (7) having a reduced diameter compared to diameters of the two lands (18, 19) of the additional switch piston (7), a first control port (36) of the at least two control ports is connected to the switching element pilot pressure (p_K) and is connectable with a second control port of the at least two control ports (37, 38), depending on an axial position of the additional switch piston (7), for controllably providing the switching element pilot pressure (p_K) at the second control port of the at least two control ports (37, 38); and an emergency switch valve (22) comprising a valve gate (23) which is axially biased in first position by a spring and hydraulically biased in a second position when a chamber (227) is pressurized by the adjustable actuator pilot pressure (P_MV), in the second position of the valve gate (23) the pilot pressure (p_K) of the switching element (2) is directed from the emergency switch valve (22) to the working chamber (9) of the valve mechanism (3) via an or-valve (25), for engaging a forward drive gear.

7. The device according to claim 6, wherein when the first control port (36) of the valve mechanism (3) is connected with the second control port (37) of the at least two control ports (37, 38), the working chamber (9) of the valve mechanism (3) is supplied with the switching element pilot pressure (p_K) via the additional switch piston (7), the second control port (37) and an or-valve (25) of the valve mechanism (3).

* * * * *